April 5, 1966   W. L. ROBERTS   3,244,799
ELECTRICAL CABLE WITH CABLE CORE WARP
Filed April 2, 1963

INVENTOR
WALTER L. ROBERTS
BY
ATTORNEY

United States Patent Office 3,244,799
Patented Apr. 5, 1966

3,244,799
ELECTRICAL CABLE WITH CABLE CORE WRAP
Walter L. Roberts, Hickory, N.C., assignor to Superior Cable Corporation, Hickory, N.C., a corporation of North Carolina
Filed Apr. 2, 1963, Ser. No. 269,944
7 Claims. (Cl. 174—107)

This invention relates to electrical cables of the type comprising a conductor core formed of a plurality of individually insulated conductor wires, the composite core being encased in an insulating and protective covering. More particularly, the invention consists in new and useful improvements in a protective barrier for use in connection with conventional cables of this nature, and designed to be interposed between the periphery of the core and the outer protective covering.

In conventional electrical cables of this type, various protective barriers have been employed in efforts to fulfill several different requirements which are necessary both during the processing of the cable core in the manufacturing plant, and in the future use of the cable in the field. For example, one of these requirements is mechanical protection whereby the core wrap will resist punctures by foreign materials and by the edges or slivers from metallic coverings which are usually applied over the core wrap. It is important that the core wrap provide some degree of cushioning so that the insulation on the conductors of the cable core is not crushed by irregularities in the metallic shield at the time of its application or in subsequent use, as cables of this type are frequently reeled and unreeled several times during their lifetime.

Another important requirement is the provision of thermal insulation, particularly against damage during the application of the thermoplastic jacket which is usually applied over the metallic shield. These thermoplastic jackets are applied in a molten state at temperatures sufficiently high to cause the insulation on the core conductors to suffer damage from the heat unless the core wrap can retard the temperature rise in the core until the temperature of the external jacket can be lowered to within a safe range.

It is also important that the core wrap possess the required dielectric strength in separating the conductors in the cable core from the metallic shield. In the use of these cables in the field, the metallic shield is usually held at ground potential, and during periods of overpotential on the conductors in the cable core (usually caused by lightning), the cable core wrap serves to prevent a dielectric failure of the insulation on the cable conductors and grounding of the conductors which would result in their inoperativeness.

Electrical stability is also an important feature, as the core wrap material must have original electrical properties which will not adversely affect the electrical properties of the cable core. A low dielectric constant, low dissipation factor, and high dielectric strength are desirable. Furthermore, the core wrap material must retain these properties during its operating life in the field. For example, a material which would absorb moisture and thereby change its electrical properties is extremely undesirable.

Heretofore, it has been the conventional practice to undertake to achieve these essential results by laminating a series of different materials, each of which was intended to partially provide the desired characteristics, so that collectively, the composite wrap would meet these various requirements. Although in some instances, a single material has been used in the interest of economy, this has been at the sacrifice of one or more of the needed properties.

It is therefore the primary object of the present invention to provide a single now-laminated core wrap or protective barrier formed of a suitable material which can be surface-contoured to provide all of these required characteristics without the aid of additional barrier materials.

Another object of the invention is to provide a core wrap or protective barrier which is formed of a tape of dielectric plastic material having pre-set, permanent corrugations and surface-contour-retaining properties which enable it to afford mechanical protection, thermal insulation, dielectric protection, and electrical stability for the core.

A further object of the invention is to provide a core wrap of this type which is easily applied and economical to manufacture and fabricate.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Briefly, the invention comprises the use of a longitudinally, uniformly corrugated single material strip or tape of suitable plastic film, such as a polyester film, of high dielectric strength and having surface-contour-retaining properties, as a barrier between the periphery of the cable core and the adjacent protective covering. This tape may be either spirally wound closely about the cable core or applied longitudinally thereto, with its longitudinal edges overlapping. Although other suitable plastic materials or films may be used, it has been found that a tape of polyethylene terephthalate, known commercially as Mylar, is very effective.

It has also been found that the corrugation of this plastic tape provides effective air spaces in the area between the cable core and the surrounding metallic shield. In addition, these air spaces provide insulation against heat transfer from the metallic shield to the conductor insulation during the cable jacketing operation, in accordance with known heat insulating techniques, and these same air spaces provide pneumatic cushioning against mechanical forces applied to the cable core which might otherwise damage the conductor insulation. Also, protection is afforded by the resilient deflection of the corrugations themselves under the load applied to the tape. Furthermore, dielectric strength between the conductors of the core and the metallic shield is improved by the elimination of damaged conductor insulation. Inasmuch as this plastic material is completely non-absorbent, damage by moisture which might change the electrical properties of the cable is avoided.

It should also be pointed out that from the standpoint of economy in fulfilling the requirements of an effective core wrap, the corrugation of the core wrap tape serves a highly important end. By uniformly corrugating the tape, a ratio of effective thickness of the corrugated tape to the normal flat tape, of the order of 6:1 can be obtained. In other words, a flat tape of a thickness of .002 inch can be increased to an effective thickness of .012 inch. Of course, other ratios are possible for obtaining the desired characteristics, and corrugation height and spacing can be proportioned within certain limits, depending upon the original thickness of the plastic material, the stiffness of the material, and the amount of air space desired to be included between the corrugations.

Also, the cross-sectional profiles of the corrugations may be either triangular, square, trapezoidal, semi-circular, or sinusoidal, or various combinations of these shapes.

In one of the preferred embodiments of the invention, using a tape of polyethylene terephthalate of a normal flat thickness of .002 inch, the tape was corrugated to an effective thickness of .010 inch. The corrugation shape was approximately semi-circular and the corrugations were uniformly spaced approximately 32 per inch of tape width.

Figure 1:
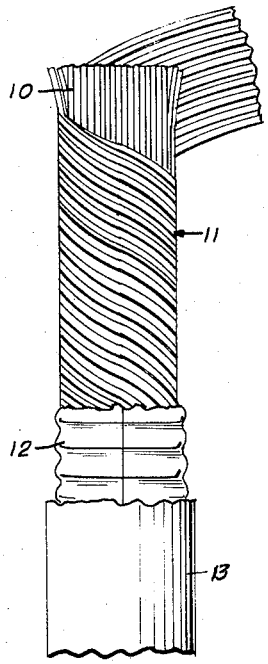
FIG. 1 shows one embodiment of a cable incorporating the present invention, with layers of material cut away so as to illustrate the various materials of the cable in elevation.

In the drawings, referring first to FIG. 1, the conductor core 10 composed of a plurality of individually insulated conductor wires, is first spirally wrapped with a longitudinally corrugated plastic tape 11, in which the corrugations have been permanently pre-set by any suitable means. Over this plastic tape, the illustrated embodiment of the invention includes a corrugated metallic sheath 12 which surrounds the barrier 11 and this, in turn, is covered with a final insulating jacket 13 which, as previously stated, is usually applied in molten state.

Figure 3:
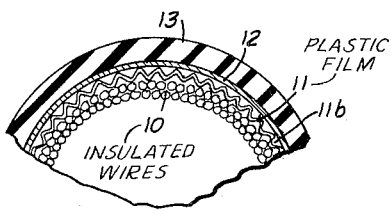
FIG. 3 is an enlarged fragmentary sectional view of the cable, taken on line 3—3 of FIG. 2.
Figure 2:
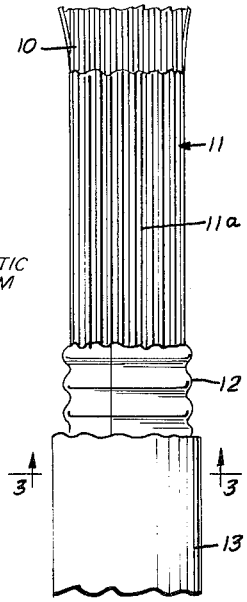
FIG. 2 is a similar view of a modified adaptation of the invention.

FIG. 2 illustrates the same general cable assembly with the exception that instead of being spirally wound upon the core 10, the barrier 11 is applied longitudinally to the periphery of the core with its longitudinal edges in overlapping relation as at 11a. In both instances, it will be seen that the corrugations of the barrier completely and closely envelop the core, which, together with the surface-contour-retaining and other characteristics of the plastic material employed for the barrier, provides the essential mechanical protection, thermal insulation, dielectric protection and electrical stability for the complete cable. Reference to FIG. 3 best illustrates the relationship of the plastic barrier 11 with respect to the core 10 and the metal shield 12. As previously explained, this figure is a sectional view taken on line 3—3 of FIG. 2 embodying the longitudinal application of the barrier, and it will be seen that the uniform corrugations 11b of the barrier 11 completely surround and closely embrace the periphery of the core 10, providing the air spaces above referred to, and, at the same time, affording the desired cushioning effect for mechanical protection.

Figure 4:
FIG. 4 is a greatly enlarged sectional view through a strip of barrier tape prior to its conditioning for use as a core barrier.
Figure 5:
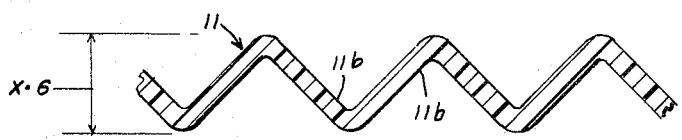
FIG. 5 is a similar sectional view through a strip of tape embodying one form of corrugations.

FIGS. 4 and 5 illustrate a 6:1 ratio of effective thickness of the corrugated tape to the normal flat thickness thereof, and FIG. 5 clearly illustrates the nature of the corrugations and their desirability in providing the cushioning and thermal insulating properties.

Figure 6:
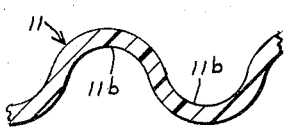
FIGS. 6 and 7 illustrate modified surface contours of corrugated tape, suitable for use in the present invention.
Figure 7:
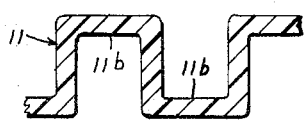

FIGS. 6 and 7 are included to illustrate possible variations in the surface contour of the corrugated barrier tape. The particular shape of the corrugations is unimportant so long as they are of a suitable depth and lateral spacing to serve the desired purpose.

It will be understood that various other suitable materials may be employed in forming this protective barrier, and that the thicknesses of tape, ratios of effective thickness to our original thickness, number of corrugations per inch of tape width, and shapes of corrugations may be varied to meet different conditions.

It may also be noted that while the primary objective of the invention is to provide a single material core wrap without the aid of additional materials, it is possible to corrugate laminations of certain materials, and such are included within the scope of the invention.

From the foregoing, it is believed that the invention may be readily understood by those skilled in the art without further description, it being borne in mind that numerous changes may be made in the details disclosed without departing from the spirit of the invention as set forth in the following claims.

I claim:

1. In an electrical cable of the type embodying an insulated conductor core, a metallic shield enveloping said core and an insulator jacket embracing said shield, a protective barrier for said core, comprising a single, non-laminated polyester film having permanently pre-set, uniform corrugations, closely surrounding said core between the latter and said shield, the material and surface contour of said film providing mechanical protection, thermal insulation, dielectric protection, and electrical stability for said core.

2. In an electrical cable of the type embodying an insulated conductor core, a metallic shield enveloping said core and an insulator jacket embracing said shield; a protective barrier for said core, comprising a single, non-laminated film of dielectric plastic material having permanently pre-set corrugations and surface-contour-retaining properties, closely surrounding said core between the latter and said shield, the material and corrugations of said film providing mechanical protection, thermal insulation, dielectric protection and electrical stability for said core.

3. In an electrical cable of the type embodying an insulated conductor core and a covering therefor; a protective barrier for said core, comprising a single, non-laminated film of dielectric plastic material having surface-contour-retaining properties, the surfaces of said film having alternately arraanged permanently pre-set rises and hollows throughout, said film closely surrounding said core between the latter and said covering to thereby provide mechanical protection, thermal insulation, dielectric protection and electrical stability for said core.

4. An electrical cable of the type embodying an insulated conductor core, a metallic shield enveloping said core and an insulator jacket embracing said shield, said core being closely wrapped with a single, non-laminated, corrugated polyester film to provide a protective barrier affording mechanical protection, thermal insulation, dielectric protection and electrical stability for said core.

5. A cable as claimed in claim 4 wherein said corrugated film is wrapped spirally on said core.

6. An electrical cable as claimed in claim 4, wherein said corrugated film is applied longitudinally to said core.

7. In an electrical cable of the type embodying an insulated conductor core including a plurality of individually insulated conductors, a metallic shield enveloping said core and an insulator jacket embracing said shield; a protective barrier for said core, comprising a single, non-laminated film of dielectric plastic material having permanently pre-set corrugations and surface-contour-retaining properties, closely surrounding said core between the latter and said shield, the material and corrugations of said film providing mechanical protection, thermal insulation, dielectric protection, and electrical stability for said core.

References Cited by the Examiner

UNITED STATES PATENTS

| 1,781,521 | 11/1930 | Palmer et al. | 174—102 |
| 2,093,114 | 9/1937 | Sonnenfeld | 174—102 |
| 2,240,274 | 4/1941 | Wade | 161—133 X |
| 2,655,978 | 10/1953 | Gonda et al. | 161—133 X |
| 3,031,523 | 4/1962 | Howard | 174—102 |

FOREIGN PATENTS

| 26,684 | of 1913 | Great Britain. |
| 545,346 | 6/1956 | Italy. |

OTHER REFERENCES

Du Pont: "Wire and Wire Products, January 1958, page 10.

JOHN F. BURNS, *Primary Examiner.*

JOHN P. WILDMAN, *Examiner.*